United States Patent [19]

Gruber

[11] Patent Number: 5,359,026
[45] Date of Patent: Oct. 25, 1994

[54] POLY(LACTIDE) COPOLYMER AND PROCESS FOR MANUFACTURE THEREOF

[75] Inventor: Patrick R. Gruber, St. Paul, Minn.

[73] Assignee: Cargill, Incorporated, Minneapolis, Minn.

[21] Appl. No.: 100,550

[22] Filed: Jul. 30, 1993

[51] Int. Cl.$^5$ .............................................. C08G 63/08
[52] U.S. Cl. ................................. 528/354; 428/290; 428/480; 428/481; 525/415; 528/357; 528/361
[58] Field of Search ................ 525/415; 528/354, 357, 528/361; 606/228; 428/290, 480, 481; 604/358

[56] References Cited

U.S. PATENT DOCUMENTS

| | | | |
|---|---|---|---|
| 4,195,167 | 3/1980 | Knopf et al. | 528/408 |
| 4,644,038 | 2/1987 | Protzman | 525/412 |
| 5,080,665 | 1/1992 | Jarrett et al. | 528/354 |
| 5,216,043 | 6/1993 | Sipinen et al. | 523/126 |
| 5,225,521 | 7/1993 | Spinu | 528/354 |

FOREIGN PATENT DOCUMENTS

WO93/02075  2/1993  PCT Int'l Appl. .

OTHER PUBLICATIONS

Kim et al., "Multifunctional initiation of lactide polymerization by stannous octoate/pentaerythritol", *Macromol. Chem.*, 193, 1623–1631 (1992).

J. Schaefgen et al., "Synthesis of Multichain Polymers and Investigation of their Viscosities", *J. Am. Chem.*, 70, 2709–2718 (1948).

*Primary Examiner*—John Kight, III
*Assistant Examiner*—Shelley A. Dodson
*Attorney, Agent, or Firm*—Merchant, Gould, Smith, Edell, Welter & Schmidt

[57] ABSTRACT

A copolymerized poly(lactide) polymer. A lactide is copolymerized with an epoxidized fat, oil, or mixture thereof thereby resulting in poly(lactide) copolymers having improved processing properties over prior poly(lactide)s.

27 Claims, No Drawings

POLY(LACTIDE) COPOLYMER AND PROCESS FOR MANUFACTURE THEREOF

BACKGROUND OF THE INVENTION

1. Field of the Invention

The present invention relates to a poly(lactide) copolymer and a process for manufacturing same.

2. Description of the Prior Art

The continued depletion of available landfill and other disposal sites have lead to an increasing need for improved waste management practices, including the replacement of non-biodegradable or partially biodegradable polymers with polymer resins which are biodegradable. Used in conjunction with improved waste management practices such as composting or recycling, biodegradable resins can help alleviate the environmental stress due to disposal of items such as packaging materials, coated paper products, films, single use diapers and the like.

Poly(lactide)s are biodegradable polymer resins derived from annually renewable resources. They have been used as specialty chemicals in the medical industry, but high costs and processing difficulties have prevented their widespread use to replace conventional polymers derived from petrochemicals. Recent processing developments, such as those disclosed by Gruber et al. (U.S. Pat. No. 5,142,023), the disclosure of which is incorporated herein by reference, have made it possible to provide lower cost poly(lactide) polymers for use in packaging and other high-volume, low-margin applications.

There are a number of technical problems which have heretofore stood in the way of developing a commercially viable poly(lactide) based replacement resin for existing conventional resins. Poly(lactide) is subject to unwanted degradation during melt processing via a number of pathways, including hydrolysis, and other side reactions which, for example, result in lactide formation. It would be desirable, therefore, to produce a melt-stable poly(lactide).

Furthermore, at high processing temperatures, polymer degradation is accelerated. Accordingly, even if a melt-stable poly(lactide) can be produced, it would be desirable to provide a poly(lactide) formulation which can be processed into useful articles at reduced temperatures.

In a typical coating application or in cast film production there is a tendency for neck-in as the polymer resin leaves the die, resulting in a film or coating with a thickening at the edge. This material must be trimmed to produce a uniform coating or film. These trimmings can often be recycled, but this exposes the polymer to more thermal stress and can lead to increased degradation. Accordingly, there is a need to provide a poly(lactide) formulation which will have reduced neck-in.

In a coating application or blown film production the polymer melt must withstand certain forces, such as acceleration in going from the die to the substrate in a coating application or the gas pressure which causes stretching in a blown film. The ability to withstand these forces is called "melt-strength". Accordingly, there is a need for a poly(lactide) formulation which will have improved melt-strength.

It is also worth noting that to gain widespread acceptance in the marketplace, films from which articles are made must have the sound and feel to which consumers have grown accustomed. Therefore, there is a need to provide a poly(lactide) formulation which will provide a film or article which will provide a better "feel" to the consumer and less noise when the film is crumpled.

SUMMARY OF THE INVENTION

According to the present invention, a melt-stable polymer comprised of a copolymerized poly(lactide) is provided. The copolymerized poly(lactide) is a reaction product of lactide, optionally other cyclic ester monomers, and a copolymerizing agent. The copolymerizing agent has at least one epoxide group and preferably two or more groups per molecule, and can be an epoxidized fat, epoxidized oil, other multi-functional epoxidized compounds, or a mixture thereof, having a weight ratio of about 0.1 to about 10 percent relative to the total monomer content. A process for manufacture of the copolymerized poly(lactide) is also provided.

Optionally, stabilizing agents in the form of antioxidants and water scavengers may be added. Further, plasticizers and/or blocking agents may be added. The resultant polymer has excellent melt processibility, that being evidenced by reduced neck-in and the ability to be processed at lower temperatures.

Polymer application processes, such as casting films or extrusion coating, are generally enhanced by a polymer which does not thin excessively in an extensional (or stretching) flow. It has been found that this behavior can be imparted to the polymer by increasing the degree of molecular entanglements in the poly(lactide) polymer melt, through increasing the weight average molecular weight, increasing the polydispersity index of the polymer, and/or introducing branching into the polymer.

Other advantages of the present invention include the softer feel of films made of the inventive copolymer, and a reduction in the level of noise created when a film made from the copolymer is crumpled as compared a film made solely of poly(lactide). In addition, the use of the copolymerizing agent of the present invention will generally increase reaction rates such that increased monomer conversion rates are exhibited.

The above described features and advantages along with other various advantages and features of novelty are pointed out with particularity in the claims of the present application. However, for a better understanding of the present invention, its advantages, and objects attained by its use, reference should be made to the following examples and tables, and to the accompanying descriptive matter, which form a further part of the present application and in which preferred embodiments of the present invention are described.

DETAILED DESCRIPTION OF THE PREFERRED EMBODIMENTS

The poly(lactide) copolymers disclosed herein focus on meeting the requirements of the end user melt processor of a polymer resin. The improved processing features achievable with the present invention include lower temperature processing, lower power consumption and pressure, and increased melt strength. The copolymer of the present invention may be melt processed into films, sheets, coatings for paper, blow molded articles, fibers, foam, foamed articles, thermoformed articles, injection molded articles, non-woven fabrics, etc. These articles may thereafter be components of larger articles, such as films for diapers. The present invention is directed to a copolymerized poly(- lactide) and is not limited to any lactide polymer composition or process. Further, disclosures of various preferred reactants, reaction conditions, additives and polymerizing and processing techniques are disclosed in commonly assigned U.S. patent application Ser. Nos. 07/935,566 filed Aug. 24, 1992; 07/955,690 filed Oct. 2, 1992; 08/034,099 filed Mar. 22, 1993 and 08/071,590 filed Jun. 2, 1993, the disclosures of which are each incorporated herein by reference.

Applicants have found that the addition of a copolymerizing agent having an epoxide group during the polymerization reaction of poly(lactide) results in a poly(lactide) having improved properties. In particular, poly(lactide) is copolymerized with an epoxidized oil. During polymerization, it is believed that the oxirane oxygens of the epoxidized oil react with either terminal alcohol groups or terminal acid groups of the lactide polymer during reaction to form the copolymer. This copolymerization results in an increase in the weight average molecular weight when compared to non-copolymerized poly(lactide)s.

The number average molecular weight is determined by dividing the total weight of the system by the number of molecules in the system. The weight average molecular weight is the summation of the product of the molecular weight of the species, squared, and the number of molecules of the species divided by the summation of the product of the molecular weight of the species and the number of molecules of the species. The polydispersity index is the weight average molecular weight divided by the number average molecular weight.

The copolymers of the present invention preferably have a weight average molecular weight of about 30,000 to about 1,500,000, more preferably about 100,000 to about 1,200,000.

The present invention is directed to poly(lactide)s copolymerized with epoxidized agents. The lactide can be D-lactide, L-lactide, meso-lactide or mixtures thereof. Preferred lactides include those disclosed in the aforementioned commonly assigned U.S. patent applications.

The lactide may be a mixture, which would contain additional cyclic ester monomers. These may include, for example, dioxanones (such as p-dioxanone), lactones (such as epsilon-caprolactone or 4-valerolactone), dioxan(dione)s (such as glycolide or tetramethyl 1,4-dioxan-2,5-dione), or ester-amides (such as morpholine-2,5-dione).

Useful copolymerizing agents have epoxide groups and include epoxidized fats and oils of all kinds, preferably epoxidized fatty acids, glycerides and mixtures thereof, more preferably epoxidized animal fats, animal oils, vegetable fats, vegetable oils, monoglycerides, diglycerides, triglycerides, free fatty acids and derivatives thereof, most preferably vegetable oils. The preferred agent has multiple epoxide groups. In particular, agents such as epoxidized linseed oil and epoxidized soybean oil are most useful. Further, epoxidized oils include cottonseed oil, ground nut oil, soybean oil, sunflower oil, rape seed oil or cannola oil, sesame seed oil, olive oil, corn oil, safflower oil, peanut oil, sesame oil, hemp oil, tung oil, neat's-foot oil, whale oil, fish oil, castor oil, tall oil and the like. Possible epoxidized fats include coconut, babassu, palm, butter, lard, tallow and the like.

Epoxidized linseed oil has been used as a copolymerizing agent with great success. In particular, an epoxidized linseed oil, known as Flexol ® Plasticizer LOE (commercially available from Union Carbide Corporation) is a preferred copolymerizing agent of the present invention.

It is interesting to note that the epoxidized linseed oil is marketed as a plasticizer, however the Tg of the resultant copolymer was fairly constant, indicating little plasticizing effect at the levels tested. Further, copolymerizing agents such as epoxidized linseed oil and others act as a lubricant during processing, but the processed copolymer does not have a greasy texture.

Other well known epoxidized vegetable oils may also be used. Furthermore, unsaturated fats and oils, preferably polyunsaturated fats and oils, can be epoxidized using commonly known methods for making epoxidized fats and oils, preferably by epoxidizing methods using peroxy acids. In those reactions, a peroxy acid, such as peroxyacetic acid, is believed to react with unsaturated fatty acids to give rise to epoxidized fatty acids, within the oil, having one or more three-member oxirane ring groups. It is preferable to have more than one oxirane group per molecule.

The amount of copolymerizing agent added varies with the desired molecular weight and polydispersity index. Generally, about 0.1–10 weight percent of copolymerizing agent is added to the original lactide mixture, more preferably, about 0.1–2.0 weight percent is added, most preferably about 0.1–1.0 weight percent of a copolymerizing agent is added. The copolymerizing agent may be selected such that it is biodegradable. Thus, combinations of the lactide and copolymerizing agent will be biodegradable.

The following examples further detail advantages of the invention described herein:

EXAMPLE 1

Copolymerization of Lactide with Epoxidized Soybean Oil and Epoxidized Tall Oil

Epoxidized soybean oil (FLEXOL ® EPO, commercially available from Union Carbide) and epoxidized tall oil (FLEXOL ® EP8, commercially available from Union Carbide) were separately copolymerized with lactide. A phosphite based process stabilizer (Weston TNPP, commercially available from General Electric) was added to the lactide at 0.4 weight percent. Catalyst (2-Eythylhexanoic acid, tin(II) salt from Aldrich Co., Milwaukee, Wis.) in a tetrahydrofuran carrier was added in a molar ratio 1 part catalyst/10,000 parts lactide. Mixtures of the molten lactide, epoxidized oil, stabilizer, and catalyst were sealed in vials and polymerized at 180° C. for 2.5 hours. The samples were then dissolved in chloroform and analyzed by gel permeation chromatography using a refractive index detector and Ultrastyragel ® IR column from Waters Chromatography to determine weight average and number average molecular weights for the resulting copolymer resins. The system temperature was 35° C. and the GPC column was calibrated against poly(styrene) standards. The results of these tests appear in Table 1.

TABLE 1

| Sample | Weight Average Mol. Weight | % Conversion |
|---|---|---|
| control poly(lactide) | 240,000 | 71 |
| copolymerized with 1.0 wt % epoxidized soybean | 400,000 | 96 |

TABLE 1-continued

| Sample | Weight Average Mol. Weight | % Conversion |
|---|---|---|
| oil copolymerized with 1.5 wt % epoxidized tall oil | 178,000 | 96 |

The results for the epoxidized soybean oil show a significant increase in the weight average molecular weight, possibly indicative of a coupling or crosslinking mechanism during the copolymerization. This is attributed to the multiple oxirane functionality contained in most of the epoxidized soybean oil molecules (an average of about 4.6 oxirane oxygens/molecule). The epoxidized tall oil copolymer does not show an increase in weight average molecular weight, presumably because each of the tall oil molecules contain an average of only about 1 oxirane group. The results for both the epoxidized tall oil and the epoxidized soybean oil show an increase in reaction rate for the copolymerization, achieving 96% conversion of the monomers, while the control reaction only exhibited 71% conversion.

EXAMPLE 2

Examples of Epoxidized Linseed Oil as a Copolymerizing Agent

A copolymerized poly(lactide) was produced by adding epoxidized linseed oil to a continuous pilot plant polymerization of lactide in the same manner described in Example 1. This was accomplished by adding a solution of TNPP and epoxidized linseed oil (FLEXOL® Plasticizer LOE from Union Carbide), in a ratio of 1:2 by weight, at a rate of 10 gm/hr to the continuous polymerization such that the weight ratio of epoxidized oil to lactide was 0.55. Lactic acid was processed into lactide in a continuous pilot scale reactor, purified by distillation, and fed to a continuous polymerization reactor system. The polymerization system consisted of a 1-gallon and a 5-gallon reactor in series. The reactors are continuous feed, stirred tank reactors. The lactide feed rate was 1.1 kg/hr, the catalyst, tin (II) bis(2-ethyl hexanoate) (T-9 from Atochem) was added at a rate of 0.03 weight percent. A phosphite process stabilizer (Weston TNPP® from General Electric) was added at a rate of 0.3 weight percent. Reactor temperatures were 190° C. to 200° C. The resulting polymer pellets were bagged every eight hours and labelled as samples I–VII. The pellets were dried and collected for GPC analysis. Total run time was 52 hours generating 60 kilograms material. GPC results after drying:

TABLE 2

| Example | Time | Mn | Mw | PDI |
|---|---|---|---|---|
| start | zero | 89000 | 220000 | 2.5 |
| I | 0–8 hours | 79000 | 307000 | 2.9 |
| II | 8–16 hours | 50000 | 296000 | 5.0 |
| III | 16–24 hours | 72200 | 323000 | 4.4 |
| IV | 24–32 hours | 80900 | 339000 | 4.2 |
| V | 32–40 hours | 81500 | 316000 | 3.9 |
| VI | 40–48 hours | 76200 | 303000 | 4.0 |
| VII | 48–52 hours | 81600 | 319000 | 4.0 |

The resulting material was then subjected to a devolatilization process to remove the residual amount of unreacted monomer lactide. After devolatilization, samples III–VII were combined and used in further testing. Molecular weights of the combined fractions after devolatization were: Mn-75,000 Mw-325000 PDI-4.3 and a residual lactide level of less than 0.5 percent as recorded by a GPC.

EXAMPLE 3

Example of Vial Polymerizations with Epoxidized Oil, Showing Effect on Rate of Polymerization Tin(II) bis (2-ethylhexanoate) commercially available as 2-ethylhexanoic acid, tin(II) salt from Aldrich Chemical Company, and epoxidized linseed oil (FLEXOL® Plasticizer LOE from Union Carbide) were placed into a vial. A molten mixture of 90% L-lactide and 10% D,L-lactide, with 0.4% by weight of a stabilizer (Weston TNPP), was then added to the vial. An identical set was made up without the epoxidized oil. In each case the final catalyst concentration was 1 part catalyst per 5000 parts lactide and the epoxidized oil was 1% by weight of the final reaction mixture. The solutions were sealed and placed in an oil bath at 180° C. Samples were pulled over time and analyzed by GPC for molecular weight and extent of lactide conversion.

The experiment was repeated, except that the catalyst and the epoxidized oil were added to the molten lactide before it was placed in the respective vials.

The results of both experiments are shown in Tables 3 and 4 respectively. The epoxidized oil resulted in an increase in the polymerization reaction rate in each study. The weight average molecular weight and PDI are also higher.

TABLE 3

| Sample | Time (min.) | % Conversion | Mn | Mw | PDI |
|---|---|---|---|---|---|
| Control | 15 | 10 | 6800 | 7800 | 1.12 |
| | 30 | 16 | 39100 | 40600 | 1.04 |
| | 45 | 48 | 30400 | 40100 | 1.32 |
| | 60 | 73 | 48900 | 77800 | 1.59 |
| | 90 | 78 | 54000 | 86200 | 1.60 |
| With 1% epoxidized oil | 15 | 12 | 7800 | 8800 | 1.12 |
| | 30 | 69 | 57100 | 115000 | 2.01 |
| | 45 | 74 | 50500 | 112000 | 2.22 |
| | 60 | 80 | 67300 | 123000 | 1.82 |
| | 90 | 93 | 78400 | 176000 | 2.25 |

TABLE 4

| Sample | Time (min.) | % Conversion | Mn | Mw | PDI |
|---|---|---|---|---|---|
| Control | 15 | 0 | — | — | — |
| | 30 | 8 | 5400 | 5700 | 1.05 |
| | 45 | 18 | 14500 | 16500 | 1.14 |
| | 60 | 28 | 26400 | 29000 | 1.10 |
| | 90 | 45 | 26900 | 29000 | 1.15 |
| With 1% epoxidized oil | 15 | 11 | 7500 | 8800 | 1.17 |
| | 30 | 32 | 24700 | 29700 | 1.22 |
| | 45 | 57 | 31300 | 44000 | 1.40 |
| | 60 | 69 | 50300 | 71000 | 1.41 |
| | 90 | 84 | 53500 | 96400 | 1.80 |

EXAMPLE 4

Cast Film at Typical Extrusion Temperatures

Films of a control polymer and a copolymer of the present invention were extruded. The conditions and the results follow:

Extruder

Equipment: Killion 1" extruder 30/1 L/D rate with a 6" cast sheet displaced about ½ inch from a three stack chill roll. The following were the temperatures (° F.):

| Zone 1 | Zone 2 | Zone 3 | 4 | Adapter | Die | Melt | Chill Roll |
|---|---|---|---|---|---|---|---|
| 300 | 330 | 350 | 350 | 335 | 330 | 340 | 100 |

TABLE 5

Cast film results:
Base PLA (Mn = 70,000; Mw = 215,000)

| Power (amps) | Screw Speed (rpm) | Press (psi) | Take Off Setting | Thickness (mils) | Width (inches) | Neck-in (inches) |
|---|---|---|---|---|---|---|
| 12.5 | 40 | 3840 | 2.0 | 17.0 | 5.125 | 0.875 |
| 12.5 | 40 | 3840 | 4.0 | 8.0 | 4.625 | 1.375 |
| 12.5 | 40 | 3840 | 6.0 | 5.5 | 4.375 | 1.625 |
| 12.5 | 40 | 3840 | 8.0 | 4.0 | 4.250 | 1.75 |
| 12.5 | 40 | 3840 | 10.0 | 2.5 | 4.0 | 2.0 |
| 12.0 | 30 | 3610 | 10.0 | 1.5 | 4.0 | 2.0 |
| 11.5 | 20 | 3380 | 10.0 | 1.0 | 3.75 | 2.25 |
| 11.5 | 10 | 2850 | 10.0 | 0.7 | 3.75 | 2.25 |

TABLE 6

PLA w/epoxidized linseed oil (Mn = 75,000; Mw = 325,000)

| Power (amps) | Screw Speed (rpm) | Press (psi) | Take Off Setting | Thickness (mils) | Width (inches) | Neck-in (inches) |
|---|---|---|---|---|---|---|
| 5.5 | 40 | 1950 | 2.0 | 12.0 | 5.0 | 1.0 |
| 5.0 | 40 | 1950 | 4.0 | 8.5 | 5.0 | 1.0 |
| 5.0 | 40 | 1950 | 6.0 | 5.5 | 4.75 | 1.25 |
| 5.0 | 40 | 1950 | 8.0 | 4.0 | 4.75 | 1.25 |
| 5.0 | 40 | 1950 | 10.0 | 3.5 | 4.75 | 1.25 |
| 5.0 | 30 | 1650 | 10.0 | 2.0 | 4.75 | 1.25 |
| 5.0 | 20 | 1250 | 10.0 | 1.0 | 4.75 | 1.25 |
| 4.5 | 10 | 880 | 10.0 | 0.5 | 4.75 | 1.25 |

The results show that poly(lactide) co-polymerized with epoxidized linseed oil processes at lower power consumption and pressure, and generates a polymer with reduced neck-in.

EXAMPLE 5

Cast Film at Reduced Extrusion Temperatures

Separate films made from a poly(lactide) control polymer and from the copolymer of the present invention described in Example 2 were extruded under various conditions. The resulting films were then evaluated using standard measuring techniques. The extruding conditions and the data gathered from this evaluation are set forth below:

| | Extruder Temperatures (°F.) of: | | | | | | |
|---|---|---|---|---|---|---|---|
| Zone 1 | Zone 2 | Zone 3 | Zone 4 | Adapter | Die | Melt | Chill Roll |
| 285 | 295 | 305 | 305 | 305 | 305 | 305 | 100 |

TABLE 7

Cast film results:
PLA w/epoxidized linseed oil

| Power (amps) | Screw Speed (rpm) | Press (psi) | Take Off Setting | Thickness (mils) | Width (inches) | Neck-in (inches) |
|---|---|---|---|---|---|---|
| 10.5 | 40 | 3470 | 2.0 | 10.0 | 5.125 | 0.875 |
| 10.0 | 40 | 3470 | 4.0 | 6.0 | 5.125 | 0.875 |
| 10.0 | 40 | 3470 | 6.0 | 4.0 | 5.125 | 0.875 |
| 10.0 | 40 | 3470 | 8.0 | 3.5 | 5.0 | 1.0 |
| 10.0 | 10 | 3470 | 10.0 | 2.5 | 5.0 | 1.0 |
| 7.5 | 30 | 3250 | 10.0 | 1.5 | 5.0 | 1.0 |
| 6.0 | 20 | 2720 | 10.0 | 0.7 | 5.0 | 1.0 |

TABLE 7-continued

Cast film results:
PLA w/epoxidized linseed oil

| Power (amps) | Screw Speed (rpm) | Press (psi) | Take Off Setting | Thickness (mils) | Width (inches) | Neck-in (inches) |
|---|---|---|---|---|---|---|
| 6.0 | 10 | 2000 | 10.0 | 0.5 | 5.125 | 0.875 |
| 2.5 | 4.5 | 1450 | 10.0 | 0.25 | 5.25 | 0.75 |
| 2.5 | 1.0 | 920 | 10.0 | 0.1 | 5.25 | 0.75 |

Under similar extrusion temperatures, the control poly(lactide) could not run because the power consumption exceeded maximum levels (>15 amps). The results show that poly(lactide) polymerized with epoxidized linseed oil has the benefit of processing at lower temperatures and generates a polymer with increased melt strength, less neck-in and a film of lower thickness.

EXAMPLE 6

Blown Film of Base Poly(lactide) w/Epoxidized Linseed Oil

A copolymer of lactide with epoxidized linseed oil was prepared in the manner described in Example 2 and was blown into a 8 inch width film at thickness from 3.0 to 0.5 mils. The blown film line consisted of a Killion tower connected to a Killion 1" extruder 30:1 L/D ratio equipped with a 2.25 inch blown film die. Distance from the die to the towers nip roll was 2.5 feet.

TABLE 8

| | Extruder Temperatures (°F.): | | | | | | |
|---|---|---|---|---|---|---|---|
| Zone 1 | Zone 2 | Zone 3 | Zone 4 | Adapter | Die | Melt | Chill Roll |
| 300 | 320 | 330 | 325 | 310 | 310 | 310 | 320 |

Operation of the blown film line was very smooth.

It will be understood that even though these numerous characteristics and advantages of the invention have been set forth in the foregoing description, together with details of the structure and function of the invention, the disclosure is illustrative only, and changes may be made in detail, especially in matters of shape, size and arrangement of the parts or in the sequence or the timing of the steps, within the broad principle of the present invention to the full extent indicated by the broad general meaning of the terms in which the appended claims are expressed.

I claim:

1. A polymer composition comprising the reaction product of a mixture comprising:
   (a) lactide; and,
   (b) about 0.1 to 10%, by weight, of a copolymerizing agent comprising an expoxidized material containing two or more epoxy groups per molecule.

2. A polymer composition according to claim 1 wherein said copolymerizing agent comprises epoxidized linseed oil.

3. A polymer composition according to claim 2 having a polydispersion index of at least 2.9.

4. A polymer composition according to claim 2 having a polydispersion index of at least 4.0.

5. A polymer composition according to claim 2 having a weight average molecular weight of at least 296,000.

6. A polymer composition according to claim 1 having a polydispersion index of at least 2.9.

7. A polymer composition according to claim 6 having a weight average molecular weight of from about 100,000 to about 1,200,000.

8. A polymer composition according to claim 23 wherein:
(a) said copolymerizing agent comprises epoxidized soybean oil.

9. A polymer composition according to claim 8 having a weight average molecular weight of at least 400,000.

10. A polymer composition according to claim 8 having a weight average molecular weight of from about 100,000 to about 1,200,000.

11. A polymer composition according to claim 1 wherein the mixture, from which the polymer composition is formed, further comprises monomer cyclic esters selected from the group consisting essentially of: dioxanones, lactones, dioxan(dione)s, ester-amides and mixtures thereof.

12. A polymer composition according to claim 1 which has a weight average molecular weight of from about 100,000 to about 1,200,000.

13. A polymer composition according to claim 1 which is melt stable to processing through an extruder having a portion thereof that is in contact with the polymer composition, at a temperature of at least 285° F.

14. A process for manufacturing a poly(lactide) copolymer; said process comprising the steps of:
(a) providing a mixture comprising:
   (i) lactide; and,
   (ii) about 0.1 to 10%, by weight, of a copolymerizing agent comprising an epoxidized material containing two or more epoxy groups per molecule; and,
(b) polymerizing the lactide and the copolymerizing agent to produce a copolymerized poly(lactide) having a weight average molecular weight of about 100,000 to about 1,200,000 and a polydispersion index of at least 2.9.

15. A method of forming a polymer film; said method including a step of:
(a) extruding a polymer composition comprising the reaction product of a mixture comprising:
   (i) lactide; and,
   (ii) about 0.1 to 10%, by weight, of a copolymerizing agent comprising an epoxidized material containing two or more epoxy groups per molecule.

16. A method according to claim 15 wherein said step of extruding comprises a step of forming a cast film.

17. A method according to claim 16 wherein said step of extruding comprises a step of forming a blown film.

18. A polymer composition comprising the product of a reaction mixture wherein the non-catalyst, reactive components of the mixture consist essentially of:
(a) lactide material selected from the group consisting essentially of lactide and polylactide; and
(b) about 0.1 to 10%, by weight, of a copolymerizing agent comprising an epoxidized material containing two or more epoxy groups per molecule.

19. A film comprising the polymer of claim 1.

20. A diaper comprising the film of claim 19.

21. A sheet comprising the polymer of claim 1.

22. A coated paper comprising paper coated with the polymer of claim 1.

23. A blow molded article comprising the polymer of claim 1.

24. A thermoformed article comprising the polymer of claim 1.

25. An injection molded article comprising the polymer of claim 1.

26. A non-woven fabric comprising the polymer of claim 1.

27. The polymer of claim 1 wherein said reactants further comprise:
(iii) catalyst means for catalyzing the polymerization of lactide to form poly(lactide) polymer chains, said catalyst means incorporated into the biodegradable polymer during polymerization.

* * * * *

UNITED STATES PATENT AND TRADEMARK OFFICE
CERTIFICATE OF CORRECTION

PATENT NO. : 5,359,026

DATED : October 25, 1994

INVENTOR(S) : Patrick R. Gruber

It is certified that error appears in the above-identified patent and that said Letters Patent is hereby corrected as shown below:

On the title page:

Item: [75], Inventors section, delete "Inventor" and insert therefore --Inventors--.

Item: [75], Inventors section, delete "Minn." after the word "St. Paul".

Item: [75], Inventors section, after the words "St. Paul", insert therefore --Jeffrey J. Kolstad, Wayzata, David R. Witzke, Minneapolis, all of Minn.--.

Column 2, line 38, after the word "compared", insert --to--.

Column 3, line 5, delete "patent application" and insert therefore --Patent Application--.

Column 3, lines 41 and 42, delete "patent applications" and insert therefore --Patent Applications--.

Column 6, line 1, delete "devolatization" and insert therefore --devolatilization--.

Column 9, claim 8 and line 1 thereof, delete "23" and insert therefore --1--.

Signed and Sealed this

Thirtieth Day of May, 1995

Attest:

BRUCE LEHMAN

Attesting Officer

Commissioner of Patents and Trademarks